(12) United States Patent
Iyer

(10) Patent No.: US 9,507,980 B2
(45) Date of Patent: Nov. 29, 2016

(54) INTELLIGENT CONTAINER

(71) Applicant: Trimble Navigation Limited, Sunnyvale, CA (US)

(72) Inventor: Prakash Iyer, San Jose, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 17 days.

(21) Appl. No.: 14/242,884

(22) Filed: Apr. 2, 2014

(65) Prior Publication Data

US 2015/0287305 A1 Oct. 8, 2015

(51) Int. Cl.
*G08B 13/14* (2006.01)
*G06K 7/10* (2006.01)
*G07C 9/00* (2006.01)
*G08B 13/24* (2006.01)

(52) U.S. Cl.
CPC ....... *G06K 7/10297* (2013.01); *G06K 7/10366* (2013.01); *G07C 9/00103* (2013.01); *G07C 9/00111* (2013.01); *G07C 9/00896* (2013.01); *G08B 13/248* (2013.01); *G08B 13/2462* (2013.01)

(58) Field of Classification Search
CPC . G06K 7/0008; G06K 19/0723; G06Q 10/08
See application file for complete search history.

(56) References Cited

U.S. PATENT DOCUMENTS

| | | | | |
|---|---|---|---|---|
| 5,745,036 A | * | 4/1998 | Clare | G07G 1/0054 235/375 |
| 5,963,134 A | * | 10/1999 | Bowers | G06K 17/00 235/375 |
| 6,737,961 B2 | | 5/2004 | Flick | |
| 6,774,782 B2 | | 8/2004 | Runyon et al. | |
| 6,989,749 B2 | | 1/2006 | Mohr | |
| 2002/0089434 A1 | * | 7/2002 | Ghazarian | G06Q 10/08 340/988 |
| 2008/0106410 A1 | * | 5/2008 | Jesionowski | G06K 7/0008 340/572.1 |
| 2008/0250726 A1 | * | 10/2008 | Slagel | E04H 1/1205 52/79.8 |
| 2014/0327524 A1 | * | 11/2014 | Jones | G06K 7/10386 340/10.42 |

* cited by examiner

*Primary Examiner* — George Bugg
*Assistant Examiner* — Anthony D Afrifa-Kyei
(74) *Attorney, Agent, or Firm* — Kilpatrick Townsend & Stockton LLP

(57) ABSTRACT

An intelligent container apparatus is provided. The intelligent container apparatus comprises a container further comprising a plurality of 3-D cells and an external electronic lock. Each 3-D cell is assigned to store at least one asset including an Asset/ID tag, and at least one asset position sensor. The external electronic lock further comprises: a reader gate; a timing device; a tech/ID authentication system; and a processor. The reader gate is configured to read an Asset/ID tag, configured to read a technician tech/ID tag, configured to assign a checked_in/checked_out status to at least one asset having an Asset/ID tag, and configured to associate the tech/ID of the latest technician who checked_in/checked_out the asset having the Asset/ID tag.

20 Claims, 1 Drawing Sheet

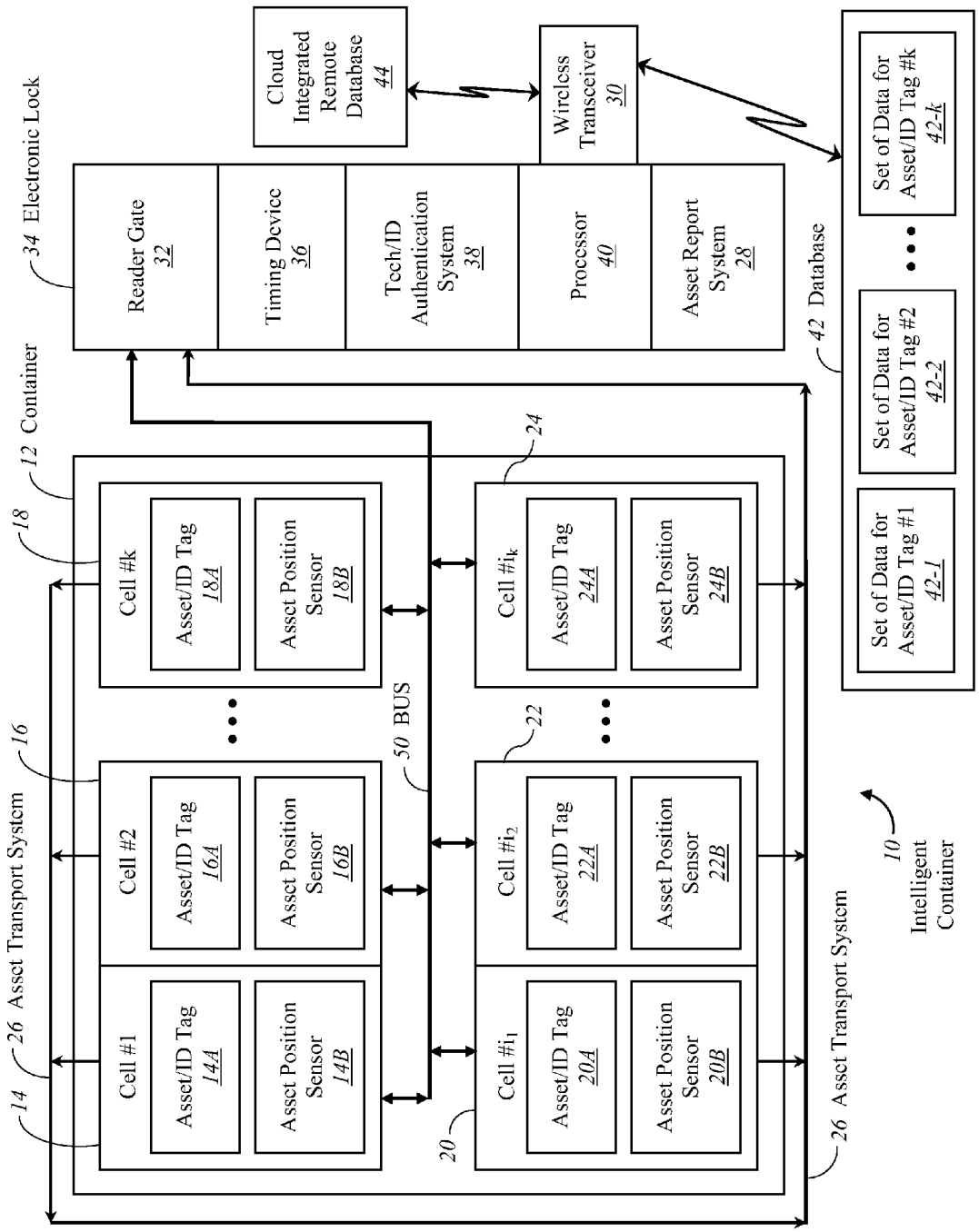

INTELLIGENT CONTAINER

TECHNICAL FIELD

The technology relates to the utilization of a number of near field communication technologies (for example, RFID, Blue Tooth, etc.) for prevention of theft of specific tools.

BACKGROUND

In the prior art, there are many instances when RFID tags are utilized to grant access to a particular tool or instrument only to authorized personal.

For example, in a hospital setting, a lot of work has been done to design a critical care system around patient tags to reduce accidental surgical procedures on misidentified patients.

However, merely associating a tool with a technician is not enough to prevent many unintended events like theft, or failure to return a borrowed tool by a technician within a specific time frame; or failure to identify a technician who borrowed a particular tool.

Thus, what is needed is to associate at least the following parameters: (A) a specific tool tag of a particular tool being checked in into/or being checked out from a specific storage facility; (B) a specific technician tag of a particular technician who checked in or checked out the tool having the specific tool tag; (C) a recorded timing coordinate of when the particular tool having the specific tool tag was due to be checked in and when it has been actually returned; and (D) a recorded timing coordinate of when the particular tool having the specific tool tag has been checked out and for what time period.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An intelligent container apparatus is provided. The intelligent container apparatus comprises a container further comprising a plurality of 3-D cells and an external electronic lock. Each 3-D cell is assigned to store at least one asset including an Asset/ID tag, and at least one asset position sensor.

The external electronic lock further comprises: a reader gate; a timing device; a tech/ID authentication system; and a processor. The reader gate is configured to read an Asset/ID tag, configured to read a technician tech/ID tag, configured to assign a checked_in/checked_out status to at least one asset having an Asset/ID tag, and configured to associate the tech/ID of the latest technician who checked_in/checked_out at least one asset having the Asset/ID tag.

DESCRIPTION OF THE DRAWINGS

The accompanying drawings, which are incorporated in and form a part of this specification, illustrate embodiments of the technology and, together with the description, serve to explain the principles below:

FIG. 1 illustrates a block diagram of an intelligent container for the purposes of the present technology.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

In an embodiment of the present technology, FIG. 1 illustrates the block diagram 10 of an intelligent container further comprising a container 12.

In an embodiment of the present technology, FIG. 1 illustrates the container 12 further comprising a plurality of 3-D cells 14, 16, 18, 20, 22, and 24.

In general, a 3-D object means a three dimensional object. In particular, a 3-D cell means a three-dimensional cell.

In an embodiment of the present technology, FIG. 1 illustrates 3-D cell #1 (14) configured to physically store at least one asset (not shown) having Asset/ID tag 14A and configured to physically store at least one asset position sensor 14B.

In an embodiment of the present technology, the Asset/ID tag 14A is selected from the group consisting of: an RFID tag; a low power RFID tag; a barcode; an infrared tag; and an ultrasound tag.

Referring still to FIG. 1, in an embodiment of the present technology, the Asset/ID tag 14A can be implemented by using Radio-frequency identification (RFID) technology that uses communication through the use of radio waves to exchange data between the reader gate 32 (please, see the discussion below) and the Asset/ID tag 14A of an electronic tag attached to the asset (not shown), for the purpose of identification the status of the asset as being checked-in into the container 12 or being checked out from the container 12. (Please, see the discussion below)

RFID makes it possible to give each asset its own unique identifying number (Asset/ID tag), or to provide every technician with its unique identifying number (Tech/ID). (Please, see the discussion below).

Furthermore, passive RFID tags (those without a battery) can be read if passed within close enough proximity to an RFID reader. It is not necessary to "show" them to it, as with a barcode. In other words it does not require line of sight to "see" an RFID tag, the tag can be read inside a case, carton, box or other container, and unlike barcodes RFID tags can be read hundreds at a time. Barcodes can only be read one at a time.

Some RFID tags can be read from several meters away and beyond the line of sight of the reader. The application of bulk reading enables an almost simultaneous reading of tags.

Radio-frequency identification involves the hardware known as interrogators (also known as readers), and tags (also known as labels), as well as RFID software or RFID middleware. The novel RFID tags are selected from the group consisting of: a High Frequency (HF) RFID tag; and an Ultra High Frequency (UHF) RFID tag.

Most RFID tags (for example Asset/ID Tag 14A of FIG. 1) contain at least two parts: one is an integrated circuit for storing and processing information, modulating and demodulating a radio-frequency (RF) signal, and other specialized functions (not shown); the other is an antenna (not shown) for receiving and transmitting the RF signal.

RFID can be either passive (using no battery), active (with an on-board battery that always broadcasts or beacons its signal) or battery assisted passive "BAP" which has a small battery on board that is activated when in the presence of an RFID reader.

In an embodiment of the present technology, an Asset/ID tag of FIG. 1 (for example the Asset/ID tag 14A) is implemented by using a combination of an RFID tag and an infrared tag. The combination of active RFID tags and infrared technology enables the system to work in data environment that have both open and closed Data Generation Devices. In this scenario, the short range of infrared signal is an advantage.

In an embodiment of the present technology, the Asset/ID tag 14A of FIG. 1 is implemented by using an ultrasound tag.

For example, the PC-Detector from Sonitor Technologies uses ultrasound indoor positioning and real time location systems (RTLS) technology to automatically track the real time location of patients and moveable hospital equipment. The RTLS solution makes the Sonitor ultrasound tag signal detectable by computers not already equipped with the hardware and sound processing capabilities that are required to pinpoint indoor positioning system tags. By leveraging existing computer hardware and LAN connectivity, mobile computing systems such as tablet PCs, computer/medication carts, and other point-of-care devices can track the tags with reliable 100 percent room-level and bed-level location accuracy. Sonitor Technologies Inc. is located in Largo, Fla.

Referring still to FIG. 1, in an embodiment of the present technology, the Asset/ID tag 14A includes an externally readable code selected from the group consisting of: a radio code transmitted on a specific frequency; a radio code transmitted on a specific frequency periodically; a radio code transmitted on a specific frequency aperiodically; an infrared code; an infrared code transmitted on a specific frequency periodically; an infrared code transmitted on a specific frequency aperiodically; an ultrasound transmitted on a specific frequency; an ultrasound transmitted on a specific frequency periodically; and an ultrasound transmitted on a specific frequency aperiodically.

In an embodiment of the present technology, the asset position sensor 14B of FIG. 1 is selected from the group consisting of: a radio-based position sensor; an image-capturing position sensor; and Wi-Fi enabled position sensor.

In an embodiment of the present technology, the asset position sensor 14B further comprising the radio-based position sensor is selected from the group consisting of: a satellite navigation sensor; a pseudolite navigation sensor; and a cell phone sensor.

In an embodiment of the present technology, the asset position sensor 14B comprising a satellite navigation sensor further comprises a Global Navigation Satellite System (GNSS) sensor (not shown).

Satellite positioning system (SATPS) is a system of satellites that provide autonomous geo-spatial positioning with global coverage. It allows small electronic receivers to determine their location (longitude, latitude, and altitude) to high precision (within a few meters) using time signals transmitted along a line-of-sight by radio from satellites. The signals also allow the electronic receivers to calculate the current local time to high precision, which allows time synchronization. A satellite navigation system with global coverage may be termed a global navigation satellite system or GNSS.

As of 2013, only the United States NAVSTAR Global Positioning System (GPS) and the Russian GLONASS are global operational GNSSs. China is in the process of expanding its regional BeiDou navigation system into the global Compass navigation system by 2020. The European Union's Galileo positioning system is a GNSS in initial deployment phase, scheduled to be fully operational by 2020 at the earliest. France, India and Japan are in the process of developing regional navigation systems.

Global coverage for each system is generally achieved by a satellite constellation of 20-30 medium Earth orbit (MEO) satellites spread between several orbital planes. The actual systems vary, but use orbital inclinations of >50° and orbital periods of roughly twelve hours (at an altitude of about 20,000 kilometers (12,000 mi)).

The global navigation satellite system (GNSS) positioning for receiver's position is derived through the calculation steps, or algorithm, given below. In essence, GNSS receiver measures the transmitting time of GNSS signals emitted from four or more GNSS satellites and these measurements are used to obtain its position (i.e., spatial coordinates) and reception time.

Example I

Spectrum technologies has a field scout device with GPS capabilities http://www.specmeters.com/store/cm1000/?F_Sort=2#description.

In an embodiment of the present technology, referring still to FIG. 1, the asset position sensor 14B further comprises a pseudolite navigation sensor (not shown).

Pseudolite is a contraction of the term "pseudo-satellite," used to refer to something that is not a satellite which performs a function commonly in the domain of satellites. Pseudolites are most often small transceivers that are used to create a local, ground-based GPS alternative. The range of each transceiver's signal is dependent on the power available to the unit. Being able to deploy one's own positioning system, independent of the GPS, can be useful in situations where the normal GPS signals are blocked/jammed (military conflicts).

In an embodiment of the present technology, the asset position sensor 14B further comprises a cell phone sensor (not shown) that uses a cell phone network to obtain the position coordinates of asset having Asset/ID tag 14A by using triangulation.

In an embodiment of the present technology, the asset position sensor 14B further comprises a Wi-Fi enabled position sensor (not shown). Wi-Fi enabled position sensor is being used today already as an indoor positioning system.

In an embodiment of the present technology, by measuring signal strength of at least one Wi-Fi transmitter, one can estimate proximity to that transmitter. With more than one Wi-Fi transmitter, triangulation [trilateration] is feasible.

In an embodiment of the present technology, the asset position sensor 14B further comprises an image-capturing position sensor (not shown).

In an embodiment of the present technology, the image-capturing position sensor is selected from the group consisting of: a visible camera; a monochromatic camera; a multispectral camera; a hyper spectral camera; a digital camera; a digital video camera; a digital camcorder; a stereo digital camera; a stereo video camera; an infrared (IR)

camera; an ultraviolet (UV) camera; a motion picture camera; a television camera; and a non-photometric 3D scanner.

Digital camera (or digicam for short) is a camera that takes video or still photographs, or both, digitally by recording images via an electronic image sensor. Digital cameras can do things film cameras cannot: displaying images on a screen immediately after they are recorded, storing thousands of images on a single small memory device, recording video with sound, and deleting images to free storage space. Some can crop pictures and perform other elementary image editing.

Fundamentally they operate in the same manner as film cameras, typically using a lens with a variable diaphragm to focus light onto an image pickup device.

The combination of the diaphragm and a shutter mechanism is used to admit the correct amount of light to the imager, just as with film; the only difference is that the image pickup device is electronic rather than chemical. Digital cameras are incorporated into many devices ranging from PDAs and mobile phones (called camera phones) to vehicles.

In an embodiment of the present technology, referring still to FIG. 1, the asset position sensor 14B comprising an image capturing device includes an infrared (IR) camera. A thermographic camera, sometimes called a FLIR (Forward Looking InfraRed), or an infrared camera less specifically, is a device that forms an image using infrared radiation, similar to a common camera that forms an image using visible light. Instead of the 450-750 nanometer range of the visible light camera, infrared cameras operate in wavelengths as long as 14,000 nm (14 µm).

Infrared energy is just one part of the electromagnetic spectrum that encompasses radiation from gamma rays, x-rays, ultra violet, a thin region of visible light, infrared, terahertz waves, microwaves, and radio waves. These are all related and differentiated in the length of their wave (wavelength). All objects emit a certain amount of black body radiation as a function of their temperatures. Generally speaking, the higher an object's temperature is the more infrared radiation as black-body radiation it emits. A special camera can detect this radiation in a way similar to an ordinary camera does visible light. It works even in total darkness because ambient light level does not matter. This makes it useful for rescue operations in smoke-filled buildings and underground.

Images from infrared cameras tend to be monochromatic because the cameras are generally designed with only a single type of image sensor responding to single wavelength range of infrared radiation. Sometimes these monochromatic images are displayed in pseudo-color, where changes in color are used rather than, or in addition to, changes in intensity to display changes in the signal.

In an embodiment of the present technology, referring still to FIG. 1, the asset position sensor 14B further comprising an image capturing device includes an ultraviolet (UV) camera. Working in the ultraviolet (UV) portion of the spectrum offers significant advantages for some applications. For instance, for machine vision inspection reducing the effects of extraneous light can significantly improve contrast, speeding up or improving the accuracy of the system. With the use of CMOS cameras becoming widespread, a larger number of cameras now have significant UV sensitivity.

In an embodiment of the present technology, referring still to FIG. 1, the asset position sensor 14B comprising an image capturing device includes a monochromatic camera. In photography and computing, a grayscale or grayscale digital image is an image in which the value of each pixel is a single sample, that is, it carries only intensity information from a desired band of the electromagnetic spectrum.

In an embodiment of the present technology, referring still to FIG. 1, the asset position sensor 14B comprising an image capturing device includes a multispectral camera. Multispectral imaging is a technology to acquire image data at specific wavelengths across the electromagnetic spectrum. The wavelengths may be separated by filters or by the use of instruments that are sensitive to particular wavelengths, including light from frequencies beyond the visible light range, such as infrared. Multispectral imaging can allow extraction of additional information that the human eye fails to capture with its receptors for red, green and blue.

Full-spectrum photography is a subset of multi spectrum imaging. In practice, specialized broadband/full-spectrum film captures visible and near infrared light, commonly referred to as the "VNIR". Modified digital cameras can detect some ultraviolet, all of the visible and much of the near infrared spectrum, as most current digital imaging sensors are sensitive from about 350 nm to 1000 nm. An off-the-shelf digital camera contains an infrared hot mirror filter that blocks most of the infrared and a bit of the ultraviolet that would otherwise be detected by the image sensor, narrowing the accepted range from about 400 nm to 700 nm. Replacing a hot mirror or infrared blocking filter with an infrared pass or a wide spectrally transmitting filter allows the camera to detect the wider spectrum light at greater sensitivity. Without the hot-mirror, the red, green and blue (or cyan, yellow and magenta) colored micro-filters placed over the image sensor elements pass varying amounts of ultraviolet and infrared. A converted full-spectrum camera can be used for ultraviolet photography or infrared photography with the appropriate filters.

FluxData located in Rochester, N.Y. offers a series of 3CCD multispectral cameras of various resolutions. Users can select from FluxData's a pre-configured 5 or 7 channel Red Green Blue (RGB) color model camera, or a Near Infrared (NIR) camera, or to configure a 3CCD camera with custom specified filters. A 3CCD multispectral camera provides the advantage of 3 unique imaging sensors with a single lens system.

In an embodiment of the present technology, referring still to FIG. 1, the asset position sensor 14B comprising an image capturing device includes a hyper spectral camera. Hyperspectral imaging collects and processes information from across the electromagnetic spectrum. Unlike the human eye, which just sees visible light, hyperspectral imaging is more like the eyes of the mantis shrimp, which can see visible light as well as from the ultraviolet to infrared. Hyperspectral capabilities enable the mantis shrimp to recognize different types of coral, prey, or predators, all which may appear as the same color to the human eye.

Hyperspectral sensors look at objects using a vast portion of the electromagnetic spectrum. Certain objects leave unique 'fingerprints' across the electromagnetic spectrum. These 'fingerprints' are known as spectral signatures and enable identification of the materials that make up a scanned object. For example, having the spectral signature for oil helps mineralogists find new oil fields. Hyperspectral sensors collect information as a set of 'images'. Each image represents a range of the electromagnetic spectrum and is also known as a spectral band. These 'images' are then combined and form a three dimensional hyperspectral cube for processing and analysis. The acquisition and processing of hyperspectral images is also referred to as imaging spectroscopy.

The distinction between hyperspectral and multispectral is usually defined as the number of spectral bands. Multispectral data contains from tens to hundreds of bands. Hyperspectral data contains hundreds to thousands of bands. However, hyperspectral imaging may be best defined by the manner in which the data is collected. Hyperspectral data is a set of contiguous bands (usually by one sensor). Multispectral is a set of optimally chosen spectral bands that are typically not contiguous and can be collected from multiple sensors. Resonon West located in Bozeman, Mont. manufactures different Digital Imaging Spectrometers. It should be obvious to a person skilled in the art that the current technology is not limited to any spectral band. The necessary requirement for the use of a given spectrum of electromagnetic radiation area source of focused radiation in that band, and a sensor capable of measuring the reflected radiation in that band.

In an embodiment of the present technology, referring still to FIG. 1, the asset position sensor 14B comprising an image capturing device includes a non-photometric 3D scanner selected from the group consisting of: a laser sensor; a contact and proximity sensor; and a magnetic resonance sensor.

In an embodiment of the present technology, the laser sensor can be implemented by using blue solid-state lasers, red diode lasers, IR lasers which maybe continuously illuminated lasers, pulsed lasers, or sequenced lasers.

In an embodiment of the present technology, a laser sensor can be implemented by using positioning sensors offered by Sensor Intelligence website www.sick.com. For instance, the Laser Scanner Model Name S10B-9011DA having compact housing and robust IP 65 design may be used. This laser scanner has the following data sheet: dimensions: (W×H×D)=102×152×105 mm, the scan angle of 270°, and the switching field range of 10 meters. It has the following functionality: a stand-by mode, a 7-segment input display, an integrated parameter memory in-system, a plug CANopen interface, and low energy consumption.

In an embodiment of the present technology, referring still to FIG. 1 the external electronic lock 34 further comprises a reader gate 32 configured to read an Asset/ID tag, configured to read a technician tech/ID tag, configured to assign a checked_in/checked_out status to at least one asset having an Asset/ID tag, configured to associate a tech/ID of the latest technician who checked_in/checked_out the asset having the Asset/ID tag with the Asset/ID tag of the Asset being checked_in/checked_out.

In an embodiment of the present technology, referring still to FIG. 1 the external electronic lock 34 further comprises a reader gate 32 further comprising an Asset/ID code reader (not shown) configured to read an Assert/ID tag.

In an embodiment of the present technology, the Asset/ID code reader is selected from the group consisting of: a radio transmitter/receiver RFID tag reader; an optical transmitter/receiver barcode reader; an IR tag reader; and an ultrasound tag reader.

In an embodiment of the present technology the Asset/ID code reader further comprising an RFID reader can be implemented by using ThingMagic® Mercury 6 (M6) 4-port, multiprotocol RFID reader.

Depending on mobility, RFID readers are classified into two different types: fixed RFID and mobile RFID. If the reader reads tags in a stationary position, it is called fixed RFID. These fixed readers are set up in specific interrogation zones and create a "bubble" of RF energy that can be tightly controlled if the physics is well engineered. This allows a very definitive reading area for when tags go in and out of the interrogation zone.

In an embodiment of the present technology, if Asset/ID tag 14A is implemented by using a passive RFID tag (without a battery), it can be read if passed within close enough proximity to the RFID reader 32. It is not necessary to "show" them to it, as with a barcode. In other words it does not require line of sight to "see" an RFID tag, the tag can be read inside a case, carton, box or other container, and unlike barcodes RFID tags can be read hundreds at a time. Barcodes can only read one at a time.

Some Asset/ID tags 14A can be read from several meters away and beyond the line of sight of the reader. The application of bulk reading enables an almost simultaneous reading of tags.

In an embodiment of the present technology, the Asset/ID code reader further comprises an optical transmitter/receiver barcode reader configured to read optically visible barcodes.

In an embodiment of the present technology, the optical transmitter/receiver barcode reader can be implemented by using an Cognex DataMan® 8000 image-based handheld barcode reader. The Cognex DataMan® 8000 image-based handheld barcode reader further includes a wireless module paired with the Intelligent Base Station equipped with separate communication ports for USB, RS-232 and Ethernet options. The Cognex DataMan® 8000 image-based handheld barcode reader is manufactured by Cognex Corporation based in Natick, Mass., USA.

In an embodiment of the present technology, the reader gate 32 is implemented by using an infrared (IR) tag reader (not shown). The infrared (IR) tag reader can be implemented by using tag return signal generation, and more specifically, by using a light source to return a signal from the IR tag 14A to the tag reader 32. A modulated light signal could be produced by turning on and off a small infrared LED using short current pulses.

In an embodiment of the present technology, the infrared (IR) tag reader 32 can be implemented by using a light shutter to modulate the light striking the IR tag reader 32. Some ferroelectric devices, which require low power and behave like liquid crystal displays, could be placed in front of a plastic corner cube type reflective surface. A corner cube reflector has the unique property that it will send light back to the source in a parallel path. Such reflectors are often used on street signs, bicycle reflectors and on reflective clothing.

When the ferroelectric device is turned on, light would be allowed to pass through the device and would then bounce off the reflective material, sending the light back to the source. When the ferroelectric device is turned off, light would not reach the reflective material and would therefore be adsorbed. Some ferroelectric devices have been used for high speed video displays so they could allow high data rates. Texas Instruments also has perfected arrays of tiny mirrors that can be moved using electrostatic methods to produce a light modulator. The beauty of the optical reflective method is that the level of light reflected back to a reader would be proportional to the amount of light striking the OPID tag. (Optical RFID (aka OPID) is an alternative to RFID that is based on optical readers). The approach might allow the tag read range to be extended to hundreds of feet or perhaps even up to a mile.

In an embodiment of the present technology, the reader gate 32 is implemented by using an ultrasound tag reader (not shown). The ultrasound tag reader can be implemented by using Sonitor's ultrasound technology.

In an embodiment of the present technology, the electronic lock 34 further comprises a timing device 36.

In an embodiment of the present technology, the timing device 36 is synchronized by the externally broadcasted radio signals and is very precise.

In an embodiment of the present technology, the timing device 36 is configured to record the timing of an asset having an Asset/ID tag being checked in into the container 12 through the reader gate 32.

In an embodiment of the present technology, the timing device 36 is configured to compare the recorded timing of an asset having an Asset/ID tag being checked in into the container 12 through the reader gate 32 and the due time of the return of this asset.

In an embodiment of the present technology, the timing device 36 is configured to record the timing of an asset having an Asset/ID tag being checked out from the container 12 through the reader gate 32.

In an embodiment of the present technology, the timing device 36 is configured to record the timing of an asset having an Asset/ID tag being checked out from the container 12 through the reader gate 32 and to record the timing when this particular asset is due to be returned to the container 12.

In an embodiment of the present technology, as shown in FIG. 1, the electronic lock 34 further comprises a tech/ID authentication system 38.

In an embodiment of the present technology, a tech/ID authentication system 38 is configured to identify and verify an identity (ID) of a technician by using the unique features of the technician like unique finger prints, unique voice signature, or unique eye retina scan.

In an embodiment of the present technology, the tech/ID authentication system 38 further comprises a tech/ID tag reader (not shown). Please, see discussion above.

In an embodiment of the present technology, wherein the intelligent container 10 (of FIG. 1) further comprises a classified intelligent container requiring the check of proper clearance of a technician. If this is the case, a technician cannot check-in or check out any asset from the intelligent container before being positively identified by the tech/ID authentication system 38 selected from the group consisting of: a voice authentication device; a finger print authentication device; and a retina scan authentication device.

In an embodiment of the present technology, the technician personal authentication system further comprises a voice authentication device (not shown).

Authentify, Inc., located 8745 West Higgins Road, Suite 240, Chicago, Ill. 60631, makes a plurality of voice biometric applications.

Like a fingerprint or iris, voice is unique to the individual. What sets voice apart as a preferred authentication method for online transactions is its ability to partner with the telephone to deliver extremely accurate remote authentication.

A voice biometric is a numerical representation of the sound, pattern and rhythm of an individual's voice. A voice biometric or "voice print", is as unique to an individual as a palm or finger print.

A speaker's voice is extremely difficult to forge for biometrics comparison purposes, since a myriad of qualities are measured ranging from dialect and speaking style to pitch, spectral magnitudes, and format frequencies. The vibration of a user's vocal chords and the patterns created by the physical components resulting in human speech are as distinctive as fingerprints.

Attempts to impersonate a voice or provide voice recordings to gain fraudulent authentication fail due to the distinctive details of the voiceprint used for comparison. While voice impersonations may sound like an exact match to the human ear, detailed mathematical analysis of the print tends to reveal vast differences. Likewise, voice recordings that sound like an exact match to the human ear most often reveal distortions caused in the recording process when measured for biometric authentication purposes.

To further thwart the use of pre-recorded voiceprints, Authentify employs a model of voiceprint comparison known as text independent directed speech. In this model, verification is performed against a phrase that is randomly generated, instead of using a phrase known to the user ahead of time, such as an account password. The chances of a fraudulent user able to match the randomly generated phrase and provide a passable voice recording are remote.

The first step in understanding the reliability of a biometric authentication is to understand what a biometric actually evaluates. The goal, in biometric terms, is to limit a user from accessing an account that is not his (a False Positive) while limiting the times a user may be denied access to an account that is legitimately his (a False Negative).

It is also important to understand that all biometrics are based on probabilistic measures. As you may have heard a character in a TV courtroom drama claim, "There is only 1 chance in 28 million that this DNA belongs to someone else," he or she is pointing out the chance of error associated with probabilistic measures. This is true of all biometrics. In practice, a biometric is a mathematical model of a physical characteristic. As with all mathematical models there is always a small error introduced in the translation of the physical measure to the digital representation.

Any process that uses biometrics can be tuned to raise or lower the probability level at which a new model is accepted or rejected when compared to the original. This permits you to balance the two types of errors—the false positives and the false negatives. There is a point, referred to as the "Equal Error Rate," at which, probabilistically speaking, there is an equal chance of being falsely rejected, or falsely accepted. Beyond the Equal Error Rate, the biometric can be tuned to allow more false positives or false negatives depending on the application's security requirements.

The positive characteristics of voice biometrics compared to other means of biometric measurement contribute to a multi-factor authentication mechanism offering a higher degree of certainty that an acceptance is correct. In fact, Scientists at the IBM Watson Research Center have studied an approach similar to that of the Authentify process. They concluded that by requiring users to enroll via an HTML form and a telephony server, employing random directed speech and biometrics—casual impostors would be falsely accepted by the system in less than 0.00001% of the cases, balanced by a 0.8% false rejection of the clients.

Much better results than can be obtained using biometrics alone. Voice biometrics also offers an advantage in that it is easy to use, even in remote authentication situations. End users do not have to install any devices or software to participate in the authentication process. The familiarity of the telephone device makes it possible for users to comfortably interact with the voice biometric application without any additional training.

Perhaps the most unique characteristic of a voice biometric application is its ability to deliver additional information to or from the user. While other biometric devices such as iris and fingerprint scans deliver the biometric measurement alone, the voice component allows information such as new pin numbers or acknowledgement of license agreements to be delivered as part of the voice biometric application. This information delivery capability significantly extends the usefulness of voice biometrics in real world application environments.

Finally, after the authentication transaction is complete, Authentify's voice biometric application leaves the client with a humanly detectable audit trail. All voice interactions are recorded and the transaction information including call time and result are stored along with the recordings. A strong audit trail proves valuable for analyzing past transactions or answering questions about the validity of completed transactions.

While any biometric authentication returns a probability-based measurement of a physical trait, Authentify has honed the use of voice biometrics to provide a robust authentication tool that harnesses the inherent advantages of voice biometrics such as ease of use, reliability and information delivery capabilities.

In an embodiment of the present technology, the technician personal authentication system further comprises a fingerprint authentication device (not shown).

Fingerprint recognition or fingerprint authentication refers to the automated method of verifying a match between two human fingerprints. Fingerprints are one of many forms of biometrics used to identify individuals and verify their identity. There are two major classes of algorithms (minutia and pattern) and four sensor designs (optical, ultrasonic, passive capacitance, and active capacitance).

The analysis of fingerprints for matching purposes generally requires the comparison of several features of the print pattern. These include patterns, which are aggregate characteristics of ridges, and minutia points, which are unique features found within the patterns. It is also necessary to know the structure and properties of human skin in order to successfully employ some of the imaging technologies.

The three basic patterns of fingerprint ridges are the arch, loop, and whorl.

Arch: the ridges enter from one side of the finger, rise in the center forming an arc, and then exit the other side of the finger.

Loop: the ridges enter from one side of a finger, form a curve, and then exit on that same side.

Whorl: the ridges form circularly around a central point on the finger. Scientists have found that family members often share the same general fingerprint patterns, leading to the belief that these patterns are inherited.

The major minutia features of fingerprint ridges are: ridge ending, bifurcation, and short ridge (or dot). The ridge ending is the point at which a ridge terminates. Bifurcations are points at which a single ridge splits into two ridges. Short ridges (or dots) are ridges which are significantly shorter than the average ridge length on the fingerprint. Minutiae and patterns are very important in the analysis of fingerprints since no two fingers have been shown to be identical.

A fingerprint sensor is an electronic device used to capture a digital image of the fingerprint pattern. The captured image is called a live scan. This live scan is digitally processed to create a biometric template (a collection of extracted features) which is stored and used for matching.

Optical fingerprint imaging involves capturing a digital image of the print using visible light. This type of sensor is, in essence, a specialized digital camera. The top layer of the sensor, where the finger is placed, is known as the touch surface. Beneath this layer is a light-emitting phosphor layer which illuminates the surface of the finger. The light reflected from the finger passes through the phosphor layer to an array of solid state pixels (a charge-coupled device) which captures a visual image of the fingerprint. A scratched or dirty touch surface can cause a bad image of the fingerprint.

A disadvantage of this type of sensor is the fact that the imaging capabilities are affected by the quality of skin on the finger. For instance, a dirty or marked finger is difficult to image properly. Also, it is possible for an individual to erode the outer layer of skin on the fingertips to the point where the fingerprint is no longer visible. It can also be easily fooled by an image of a fingerprint if not coupled with a "live finger" detector. However, unlike capacitive sensors, this sensor technology is not susceptible to electrostatic discharge damage.

Fingerprints can be read from a distance by using an ultrasonic sensor.

Ultrasonic sensors make use of the principles of medical ultrasonography in order to create visual images of the fingerprint. Unlike optical imaging, ultrasonic sensors use very high frequency sound waves to penetrate the epidermal layer of skin. The sound waves are generated using piezoelectric transducers and reflected energy is also measured using piezoelectric materials. Since the dermal skin layer exhibits the same characteristic pattern of the fingerprint, the reflected wave measurements can be used to form an image of the fingerprint. This eliminates the need for clean, undamaged epidermal skin and a clean sensing surface.

Capacitance sensors use principles associated with capacitance in order to form fingerprint images. In this method of imaging, the sensor array pixels each act as one plate of a parallel-plate capacitor, the dermal layer (which is electrically conductive) acts as the other plate, and the non-conductive epidermal layer acts as a dielectric.

A passive capacitance sensor use the principle outlined above to form an image of the fingerprint patterns on the dermal layer of skin. Each sensor pixel is used to measure the capacitance at that point of the array. The capacitance varies between the ridges and valleys of the fingerprint due to the fact that the volume between the dermal layer and sensing element in valleys contains an air gap. The dielectric constant of the epidermis and the area of the sensing element are known values. The measured capacitance values are then used to distinguish between fingerprint ridges and valleys.

Active capacitance sensors use a charging cycle to apply a voltage to the skin before measurement takes place. The application of voltage charges the effective capacitor. The electric field between the finger and sensor follows the pattern of the ridges in the dermal skin layer. On the discharge cycle, the voltage across the dermal layer and sensing element is compared against a reference voltage in order to calculate the capacitance. The distance values are then calculated mathematically, and used to form an image of the fingerprint. Active capacitance sensors measure the ridge patterns of the dermal layer like the ultrasonic method. Again, this eliminates the need for clean, undamaged epidermal skin and a clean sensing surface.

Matching algorithms are used to compare previously stored templates of fingerprints against candidate fingerprints for authentication purposes. In order to do this either the original image must be directly compared with the candidate image or certain features must be compared.

Pattern based algorithms compare the basic fingerprint patterns (arch, whorl, and loop) between a previously stored template and a candidate fingerprint. This requires that the images be aligned in the same orientation. To do this, the algorithm finds a central point in the fingerprint image and centers on that. In a pattern-based algorithm, the template contains the type, size, and orientation of patterns within the aligned fingerprint image. The candidate fingerprint image is graphically compared with the template to determine the degree to which they match.

In an embodiment of the present technology, the technician personal authentication system further comprises a retinal scan authentication device (not shown).

A retinal scan, commonly confused with the more appropriately named "iris scanner", is a biometric technique that uses the unique patterns on a person's retina to identify them. It is not to be confused with another ocular-based technology, iris recognition. The biometric use of this scan is used to examine the pattern of blood vessels at the back of the eye.

The human retina is a thin tissue composed of neural cells that is located in the posterior portion of the eye. Because of the complex structure of the capillaries that supply the retina with blood, each person's retina is unique. The network of blood vessels in the retina is not entirely genetically determined and thus even identical twins do not share a similar pattern.

Although retinal patterns may be altered in cases of diabetes, glaucoma or retinal degenerative disorders, and the retina typically remains unchanged from birth until death. Due to its unique and unchanging nature, the retina appears to be the most precise and reliable biometric, aside from DNA. Advocates of retinal scanning have concluded that it is so accurate that its error rate is estimated to be only one in a million.

A biometric identifier known as a retinal scan is used to map the unique patterns of a person's retina. The blood vessels within the retina absorb light more readily than the surrounding tissue and are easily identified with appropriate lighting. A retinal scan is performed by casting an unperceived beam of low-energy infrared light into a person's eye as they look through the scanner's eyepiece. This beam of light traces a standardized path on the retina. Because retinal blood vessels are more absorbent of this light than the rest of the eye, the amount of reflection varies during the scan. The pattern of variations is converted to computer code and stored in a database.

Retinal scanners are typically used for authentication and identification purposes. Retinal scanning has been utilized by several government agencies including the FBI, CIA, and NASA. However, in recent years, retinal scanning has become more commercially popular. Retinal scanning has been used in prisons, for ATM identity verification and the prevention of welfare fraud.

Retinal scanning also has medical application. Communicable illnesses such as AIDS, syphilis, malaria, chicken pox and Lyme disease as well as hereditary diseases like leukemia, lymphoma, and sickle cell anemia impact the eyes. Pregnancy also affects the eyes. Likewise, indications of chronic health conditions such as congestive heart failure, atherosclerosis, and cholesterol issues first appear in the eyes.

Advantages of the retinal scanning: (a) low occurrence of false positives; (b) extremely low (almost 0%) false negative rates; (c) highly reliable because no two people have the same retinal pattern; (d) speedy results-identity of the subject is verified very quickly.

Disadvantages of the retinal scanning: (a) measurement accuracy can be affected by a disease such as cataracts; (b) measurement accuracy can also be affected by severe astigmatism; (c) scanning procedure is perceived by some as invasive; (d) not very user friendly; (e) subject being scanned must be close to the camera optics; (f) high equipment cost.

In an embodiment of the present technology, as shown in FIG. 1, the electronic lock 34 further comprises a processor 40 that can be implemented by using a general purpose computer or by using an ASIC (application specific integrated circuit).

In an embodiment of the present technology, as shown in FIG. 1, the intelligent container 10 further comprises a database 42.

In an embodiment of the present technology, as shown in FIG. 1, the database 42 is configured to store a plurality of markers. Each marker includes a set of data compiled for one asset having an Asset/ID tag and transferred to the database 42 by using the bus 50, and by using the wireless transceiver 30.

Example II

For example, the marker 42-1 includes a set of data including at least one Asset/ID tag 14A, a checked_in/checked_out status associated with the asset having the Asset/ID tag 14A, position coordinates (determined by the asset position sensor 14B) of the cell #1 assigned to store the asset having the Asset/ID tag 14A, a timing coordinate (recorded by the timing device 36) indicating a time and date when the asset was checked_in/checked_out, a tech/ID tag of a technician (determined by the Tech/ID authentication system 38) who checked_in/checked_out at least one asset having the Asset/ID tag 14A.

In an embodiment of the present technology, as shown in FIG. 1, the database is selected from the group consisting of: a database 42; and a cloud integrated remote database 44.

In an embodiment of the present technology, as shown in FIG. 1, the electronic lock 34 further comprises an asset report system 28 further comprising the wireless transceiver 30.

In an embodiment of the present technology, the asset report system 28 is configured to periodically report to the database (42 and/or 44) by using the transceiver 30 the updated status of at least one marker (42-1, 42-2, . . . or 42-$k$; $k$ is an integer).

In an embodiment of the present technology, the intelligent container 10 further comprises an automated asset transport system 26 configured to transport at least one asset from its assigned cell to the reader gate 32 if this asset is being checked out; and configured to transport at least one asset back from the reader gate 32 to its assigned cell if this asset is being checked in.

In an embodiment of the present technology, the automated asset transport system 26 can be implemented by using a pneumatic post or pneumatic mail.

Pneumatic post or pneumatic mail can be used to deliver an asset from its cell to the reader gate 32, and back from the reader gate 32 to its cell through pressurized air tubes.

In an embodiment of the present technology, the asset report system 28 further comprises a display (not shown) configured to display a plurality of makers, each marker being associated with one cell.

Example III

For example, the display (not shown) displays the marker 42-1 associated with at least one Asset/ID tag 14A, a checked_in/checked_out status associated with the asset having the Asset/ID tag 14A, position coordinates (determined by the asset position sensor 14B) of the cell #1 assigned to store the asset having the Asset/ID tag 14A, a timing coordinate (recorded by the timing device 36) indicating a time and date when the asset was checked_in/checked_out, a tech/ID tag of a technician (determined by the Tech/ID authentication system 38) who checked_in/checked_out at least one asset having the Asset/ID tag 14A.

In an embodiment of the present technology, the method (not shown) of the asset management by using the intelligent container 10 comprises the step (A) of storing at least one asset having an Asset/ID tag (for example the asset having the Asset/ID tag 14A) and storing an asset position sensor 14B associated with asset having the Asset/ID tag 14A in the 3-D cell 14 located inside the container 12. The asset position sensor 14B is configured to determine the position coordinates of the asset having the Asset/ID tag 14A.

In an embodiment of the present technology, the method (not shown) of the asset management by using the intelligent container 10 further comprises the step (B) of using the reader gate 32 to read an Asset/ID tag of an Asset (for example the asset having Asset/ID tag 14A) being checked in into the container 12. Each asset having Asset/ID tag (for example the asset having Asset/ID tag 14A) and being checked in into the container 12 is assigned a checked in status.

In an embodiment of the present technology, the method (not shown) of the asset management by using the intelligent container 10 further comprises the step (C) of using the reader gate 32 to read an Asset/ID tag (for example Asset/ID tag 14A) of each asset being checked out from the container 12. Each asset having the Asset/ID tag (for example the asset having Asset/ID tag 14A) and having checked out from the container 12 is assigned a checked out status.

In an embodiment of the present technology, the method (not shown) of the asset management by using the intelligent container 10 further comprises the step (D) of using the processor 40 to communicate the checked_in/checked_out status of each asset having the Asset/ID tag (for example the asset having Asset/ID tag 14A) to the asset report system 28.

In an embodiment of the present technology, the method (not shown) of the asset management by using the intelligent container 10 further comprises the step (E) of using the reader gate 32 to read a technician tech/ID tag and to associate the tech/ID of the technician with the asset having Asset/ID tag (for example the asset having Asset/ID tag 14A) being checked in into the container 12, or being checked out from the container 12.

In an embodiment of the present technology, the method (not shown) of the asset management by using the intelligent container 10 further comprises the step (F) of using the processor 40 to communicate to the asset report system 28 the status of an asset having the Asset/ID tag as being checked_in/of being checked_out by a technician having the tech/ID tag.

In an embodiment of the present technology, the method (not shown) of the asset management by using the intelligent container 10 further comprises the step (G) of using the timing device 36 to record a timing coordinate when an asset having the Asset/ID tag (for example the asset having Asset/ID tag 14A) was checked out from the container 12.

In an embodiment of the present technology, the method (not shown) of the asset management by using the intelligent container 10 further comprises the step (H) of using the processor 40 to communicate to the asset report system 28 the recorded timing coordinate when an asset having an Asset/ID tag (for example the asset having Asset/ID tag 14A) was checked out from the container 12.

In an embodiment of the present technology, the method (not shown) of the asset management by using the intelligent container 10 further comprises the step (I) of using the timing device 36 to record a timing coordinate when an asset having said Asset/ID tag (for example the asset having Asset/ID tag 14A) was checked in into the container 12.

In an embodiment of the present technology, the method (not shown) of the asset management by using the intelligent container 10 further comprises the step (J) of using the processor 40 to communicate to the asset report system 28 the recorded timing coordinate when an asset having an Asset/ID tag (for example the asset having Asset/ID tag 14A) was checked in into the container 12.

In an embodiment of the present technology, the method (not shown) of the asset management by using the intelligent container 10 further comprises the step (K) of using the processor 40 to communicate to the asset report system 28 at least one marker (for example, the marker 41-1 including a set of data associated with the asset having the Asset/ID tag 14A).

The set of data associated with at least one asset having the Asset/ID tag includes: a checked_in/checked_out status of the asset having the Asset/ID tag; a recorded timing coordinate when the asset having said Asset/ID tag was checked out from the container 12; a recorded timing coordinate when the asset having the Asset/ID tag was checked in into the container 12; a tech/ID tag of a technician who was the last to check in at least one asset having an Asset/ID tag into the container 12; and a tech/ID tag of a technician who was the last to check out at least one asset having an Asset/ID tag from the container 12.

In an embodiment of the present technology, the method of the asset management by using the intelligent container 10 further comprises the step (L) of using the wireless transceiver 30 to transmit from the asset report system 28 to the database 42 a plurality of markers, wherein each marker includes a set of data associated with at least one asset having an Asset/ID tag (for example, the marker 42-1 including a set of data associated with the asset having the Asset/ID tag 14A).

In an embodiment of the present technology, the method of the asset management by using the intelligent container 10 further comprises the step (M) of using the wireless transceiver 30 to transmit from the asset report system 28 to the cloud integrated remote database 44 a plurality of markers, wherein each marker includes a set of data associated with at least one asset having an Asset/ID tag (for example, the marker 41-1 including a set of data associated with the asset having the Asset/ID tag 14A).

In an embodiment of the present technology, the method of the asset management by using the intelligent container 10 further comprises the step (N) of using a display (not shown) to display a plurality of makers, each marker being associated with one cell.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus comprising:
    a container comprising a plurality of 3-D cells for storing a plurality of assets, each asset having an Asset/ID tag, each said 3-D cell being assigned to store at least one asset; and
    an electronic lock coupled to said container; said electronic lock comprising:
        a reader gate configured to read an Asset/ID tag of a first asset of the plurality of assets being checked out from said container by a first technician, said reader gate further configured to read a tech/ID tag of said first technician;
        an asset report system;
        a database; and
        a processor coupled to said reader gate, said asset report system, and said database, wherein said processor is configured to:
            communicate to said asset report system a checked-out status of said first asset having said Asset/ID tag read by said reader gate, said checked-out status including an association between said Asset/ID tag and said first technician having said tech/ID tag read by said reader gate; and
            store in said database a plurality of markers, each said marker including a set of data compiled for one said asset having said Asset/ID tag, said set of data including said Asset/ID tag, a checked-in or checked-out status associated with said asset having said Asset/ID tag, a tech/ID tag of a technician who checked in or checked out said asset having said Asset/ID tag, and 3-D position coordinates of a 3-D cell inside said container assigned to store said asset having said Asset/ID tag.

2. The apparatus of claim 1 wherein said processor is further configured to store in said database a timing coordinate indicating a time and a date when said asset was checked in or checked out.

3. The apparatus of claim 1, wherein said database is selected from the group consisting of:
    a database, and a cloud integrated remote database.

4. The apparatus of claim 1, wherein:
    said asset report system comprises a wireless transceiver, and said asset report system is configured to periodically report to said database by using said transceiver an updated status of at least one said marker.

5. The apparatus of claim 1 further comprising:
    an automated asset transport system configured to transport at least one said asset from its assigned 3-D cell to said reader gate if said asset is being checked out, and configured to transport at least one said asset back from said reader gate to its assigned 3-D cell if said asset is being checked in.

6. The apparatus of claim 1, wherein said Asset/ID tag is selected from the group consisting of:
    a quick response code (QR code) attached to said asset, an RFID tag, a low power RFID tag, a barcode, an infrared tag, and an ultrasound tag.

7. The apparatus of claim 1, wherein each said 3-D cell is assigned to store at least one asset position sensor for determining said 3-D position coordinates of said 3-D cell, and said asset position sensor is selected from the group consisting of:
    a radio-based position sensor, an image-capturing position sensor, and a WiFi enabled position sensor.

8. The apparatus of claim 7, wherein said image-capturing position sensor is selected from the group consisting of:
    a visible camera, a monochromatic camera, a multispectral camera, a hyper spectral camera, a digital camera, a digital video camera, a digital camcorder, a stereo digital camera, a stereo video camera, an infrared (IR) camera, an ultraviolet (UV) camera, a motion picture camera, a television camera, and a non-photometric 3D scanner.

9. The apparatus of claim 8, wherein said non-photometric 3D scanner is selected from the group consisting of:
    a laser sensor, a contact and proximity sensor, and a magnetic resonance sensor.

10. The apparatus of claim 7, wherein said radio-based position sensor is selected from the group consisting of:
    a satellite navigation sensor, a pseudolite navigation sensor, and a cell phone sensor.

11. The apparatus of claim 1, wherein said reader gate is selected from the group consisting of:
    a radio transmitter/receiver RFID tag reader, an optical transmitter/receiver barcode reader, an IR tag reader, and an ultrasound tag reader.

12. The apparatus of claim 1, wherein said electronic lock further comprises a tech/ID authentication system, and wherein said tech/ID authentication system is selected from the group consisting of:
    a tech/ID tag reader, and a personal authentication system.

13. The apparatus of claim 12, wherein said container comprises a classified container requiring checking of proper clearance of a technician, and wherein said tech/ID authentication system is selected from the group consisting of:
    a voice authentication device, a finger print authentication device, and a retina scan authentication device.

14. A method for managing a plurality of assets stored in a container, said container being coupled to an electronic lock that includes a reader gate and an asset report system, each of the plurality of assets having an electronic Asset/ID tag, said method comprising:

reading via said reader gate an Asset/ID tag of a first asset of the plurality of assets being checked out from said container by a first technician;

reading via said reader gate a tech/ID tag of said first technician;

assigning a checked-out status to said first asset having said Asset/ID tag read by said reader gate, and associating said first technician having said Tech/ID tag read by said reader gate with said checked-out status of said first asset; and transmitting to said asset report system a marker, said marker including a set of data associated with said first asset having said Asset/ID tag, wherein said set of data associated with said first asset having said Asset/ID tag includes said checked-out status of said first asset having said Asset/ID tag, said tech/ID tag of said first technician who checked out said first asset having said Asset/ID tag, and 3-D position coordinates of a 3-D cell inside the container assigned to store said first asset having said Asset/ID tag.

15. The method of claim 14, wherein said electronic lock further comprises a timing device, said method further comprising:

using said timing device to record a timing coordinate when said first asset having said Asset/ID tag was checked out; and communicating to said asset report system said timing coordinate when said first asset having said Asset/ID tag was checked out.

16. The method of claim 14, wherein said electronic lock further comprises a timing device, said method further comprising:

using said timing device to record a timing coordinate when said first asset having said Asset/ID tag was checked in; and communicating to said asset report system said recorded timing coordinate when said first asset having said Asset/ID tag was checked in.

17. The method of claim 14, wherein said set of data associated with said first asset having said Asset/ID tag further includes a timing coordinate when said first asset having said Asset/ID tag was checked out or checked in into said container.

18. The method of claim 14, wherein said asset report system comprises a wireless transceiver, the method further comprising:

using said wireless transceiver to transmit from said asset report system to a database a plurality of markers, each said marker including a set of data associated with at least one said asset having said Asset/ID tag.

19. The method of claim 14, wherein said asset report system comprises a wireless transceiver, the method further comprising:

using said wireless transceiver to transmit from said asset report system to a cloud integrated remote database a plurality of markers, each said marker including a set of data associated with at least one said asset having said Asset/ID tag.

20. The method of claim 14, further comprising:

reading via said reader gate the Asset/ID tag of said first asset being returned to said container by said first technician;

reading said tech/ID tag of said first technician; and assigning a checked-in status to said first asset having said Asset/ID tag read by said reader gate, and associating said first technician having said tech/ID tag read by said reader gate with said checked-in status of said first asset.

* * * * *